United States Patent
Ohmi et al.

(10) Patent No.: US 6,436,353 B1
(45) Date of Patent: Aug. 20, 2002

(54) GAS RECOVERING APPARATUS

(75) Inventors: Tadahiro Ohmi, 1-17-301, Komegabukuro 2-chome, Aoba-ku, Sendai-shi, Miyagi-ken 980-0813; Takahisa Nitta, Tokyo; Yasuyuki Shirai, Miyagi-ken; Taiji Hashimoto, Miyagi-ken; Kazuhide Ino, Miyagi-ken, all of (JP)

(73) Assignees: Tadahiro Ohmi, Miyagi-ken; Kabushiki Kaisha Ultraclean Technology Research Institute, Tokyo, both of (JP)

( * ) Notice: Subject to any disclaimer, the term of this patent is extended or adjusted under 35 U.S.C. 154(b) by 0 days.

(21) Appl. No.: 09/096,986

(22) Filed: Jun. 12, 1998

(30) Foreign Application Priority Data

Jun. 13, 1997 (JP) .............................. 9-157254
Jun. 12, 1998 (JP) ............................. 10-164852

(51) Int. Cl.⁷ .............................. B01D 53/02; F25J 1/00
(52) U.S. Cl. ..................... 422/171; 422/169; 422/170; 422/173; 422/177
(58) Field of Search ................ 422/171, 172, 422/177, 178, 173, 198, 169, 170; 202/183–184; 203/42; 62/614, 616, 48.2

(56) References Cited

U.S. PATENT DOCUMENTS

| | | | |
|---|---|---|---|
| 5,558,307 A | * | 9/1996 | Schmidt ....................... 62/614 |
| 5,706,674 A | * | 1/1998 | Hsiung et al. ................ 62/632 |
| 5,759,237 A | * | 6/1998 | Li et al. ......................... 95/41 |
| 5,958,138 A | * | 9/1999 | Tomita et al. ................ 62/614 |

FOREIGN PATENT DOCUMENTS

| | | |
|---|---|---|
| JP | 63-12336 A | 1/1988 |
| JP | 63-14866 A | 1/1988 |
| JP | 1-225320 A | 9/1989 |
| JP | 1-281138 A | 11/1989 |
| JP | 2-21618 A | 1/1990 |
| JP | 2-179867 A | 7/1990 |
| JP | 2-284638 A | 11/1990 |
| JP | 4-353743 A | 12/1992 |
| JP | 4-353761 A | 12/1992 |
| JP | 4-355367 A | 12/1992 |
| JP | 5-31312 A | 2/1993 |
| JP | 6-87093 A | 3/1994 |
| JP | 6-109200 A | 4/1994 |
| JP | 06346221 A | 12/1994 |
| JP | 07063634 A | 3/1995 |
| JP | 07096259 A | 4/1995 |
| JP | 07151272 A | 6/1995 |
| JP | 07197207 A | 8/1995 |
| JP | 08168896 A | 7/1996 |
| JP | 08274028 A | 10/1996 |
| JP | 09129561 | * 5/1997 |

* cited by examiner

*Primary Examiner*—Hien Tran
(74) *Attorney, Agent, or Firm*—Randall J. Knuth

(57) ABSTRACT

The present invention makes possible the recycling of exhaust has components in a manufacturing process by cooling, liquefaction, and recovery, and to use toxic or useful gases without disposal, and to dramatically reduce the frequency of exhaust system maintenance by combining such a recovery method with a vacuum exhaust system.

7 Claims, 7 Drawing Sheets

GAS RECOVERING APPARATUS

BACKGROUND OF THE INVENTION AND DESCRIPTION OF RELATED ART

1. Field of the Invention

The present invention relates to an apparatus for the recovery and reuse of exhaust gases in manufacturing processes using special material gases, and relates to a vacuum exhausting apparatus and method for conducting manufacturing processes in ultraclean atmospheres.

2. Background Art

In various processes which employ special material gases, a problem arises in that, among the exhaust gas components, exhaust gas components such as radicals or the like which remain unreacted or incompletely reacted are deposited on the surfaces of the exhaust line, and presently, regular maintenance is required.

Among the methods conventionally employed in exhaust gas processing apparatuses, removal apparatuses exist which employ dry methods, wet methods, and combustion methods.

In combustion type removal apparatuses, removal is conducted by the combustion of combustible gases, and after this, water is applied and soluble materials dissolve. In the wet removal apparatuses, gases which are soluble in water are removed. However, in these two methods, it is also necessary to treat the solution, and furthermore, once combustion has occurred, it is impossible to reuse the resources.

In dry removal apparatuses, using an adsorbing material, harmful gases are adsorbed and removed. In this case, as well, it is necessary to process the adsorbing material.

Furthermore, it is not merely the case that recovery methods have not been established; there is also a problem in that, even in vacuum exhaust methods, the exhaust gases diffuse back within the pump, and return again to the processing spaces.

OBJECT AND SUMMARY OF THE INVENTION

The present invention has as an object thereof the cooling, liquefaction, recovery and reuse of exhaust gas components in manufacturing processes, and to make it possible to use toxic or useful gases without the necessity of disposal. Furthermore, the present invention has as object thereof to drastically reduce the frequency of the maintenance of exhaust systems by combining this recovery method with a vacuum exhaust system.

As a result of diligent research, the present inventors have discovered that by subjecting the exhaust gas components which are unreacted or incompletely reacted, and are a cause of deposition, to adsorption, breakdown, or gasification, the occurrence of deposition is suppressed, and furthermore, by cooling the gases, liquefaction takes place, and in the liquid state, the recovery of harmful or useful gases can be conducted. In other words, the present invention is characterized in that, in a gas recovering apparatus comprising followings disposed downstream from the chamber in an exhaust line, adsorption columns for adsorbing one or more exhaust gas components within a exhaust gas from a chamber, or reaction tubes for directly degrading such components, a means for introducing gas which is able to react to said exhaust gas components upstream from said adsorption tubes or reaction tubes, and cooling tubes for liquefying and recovering exhaust gases from said adsorption tubes or reaction tubes.

Furthermore, the present inventors have discovered that the reverse dispersion of the exhaust gases can be suppressed by causing the flow of an appropriate amount of gas from appropriate positions in the exhaust line. In other words, the present invention comprises a vacuum exhaust method comprising a mechanism for introducing gas, a vacuum exhaust apparatus for exhausting gas and a chamber for storing a vacuum, wherein the interior of the chamber is constantly subjected to the flow of some type of gas; the present invention also comprises a vacuum exhaust apparatus in which the mechanism for introducing gas is provided between the vacuum exhaust pump and the chamber.

By means of the gas recovery apparatus of the present invention, exhausted gases which were conventionally disposed of can be recycled and reused.

Furthermore, by means of the vacuum exhausting method and apparatus of the present invention, it is possible to suppress the reverse diffusion of the exhaust gas components within the pump.

BRIEF DESCRIPTION OF THE DIAGRAMS

DETAILED DESCRIPTION OF PREFERRED EMBODIMENTS OF THE INVENTION

Hereinbelow, embodiments of the present invention will be discussed.

[Gas Recovering Apparatus]

The essential parts of the gas recovering apparatus of the present invention will be explained with reference to an example of the gas recovering apparatus of the present embodiment shown in FIG. 1.

As shown in the figure, the gas recovering apparatus of the present invention has a structure containing adsorption and recovery tubes for the exhaust gas components, and cooling tubes for liquefying and recovering the exhaust gas components, which are disposed downstream from the process chamber in the exhaust line.

Figure 1:
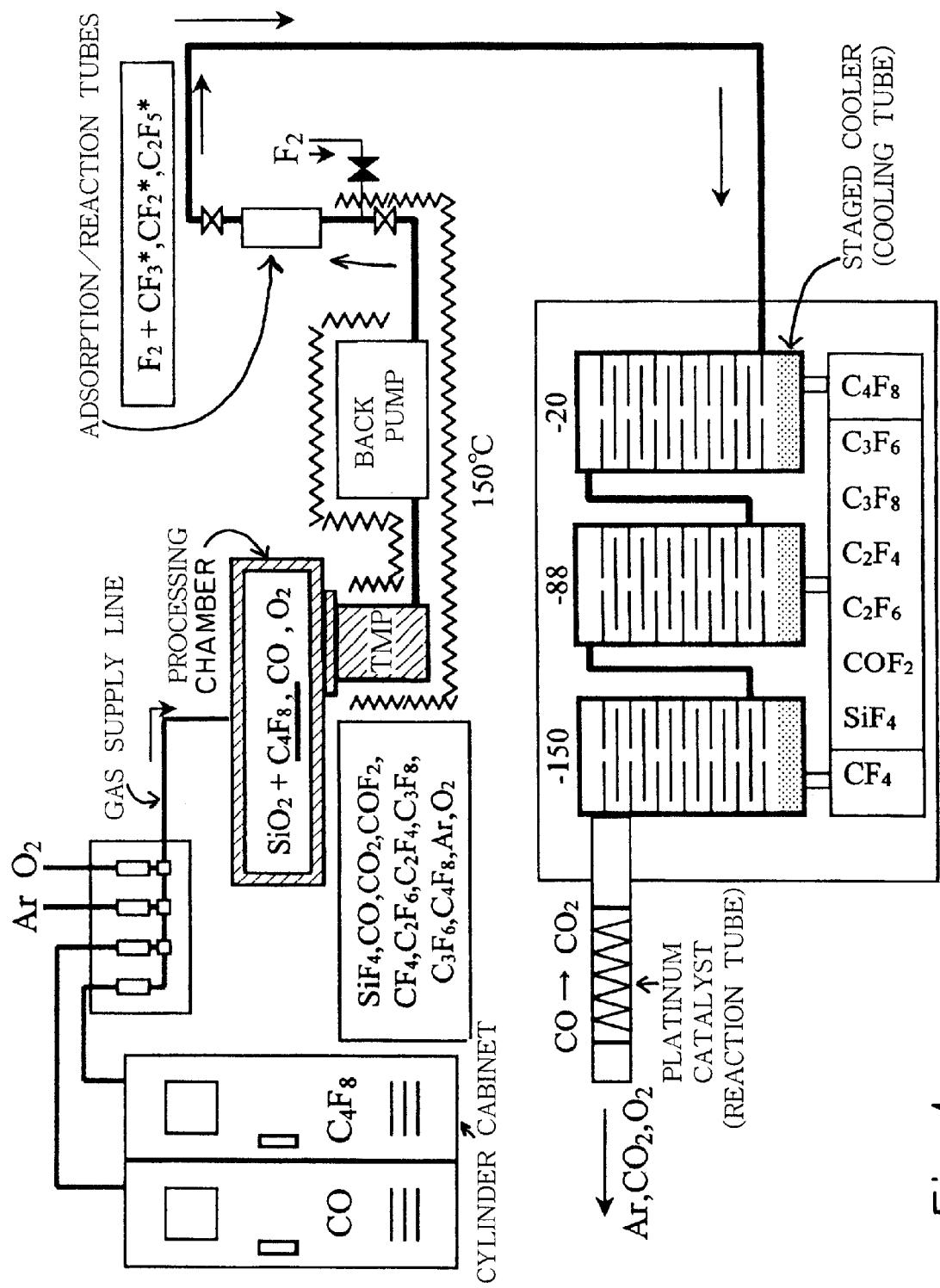
FIG. 1 is an example of a system having the gas recovering apparatus of the present invention.

The example shown in FIG. 1 refers to a vacuum process; however, the gas recovery apparatus of the present invention may also be applied to normal pressures.

The essentials of the gas recovering apparatus of the present invention are as given below. The exhaust gases which are exhausted from the process chamber pass through the exhaust line and enter the adsorption and reaction tubes for the exhaust gas components.

When the gases are introduced to the adsorption and reaction tubes, a reactant gas is added from the upstream side of the exhaust line. The reactant gas differs depending on the process to which the present invention is applied;

however, examples thereof include, for example, $F_2$, $Cl_2$, and the like. The reactant gas may be continually caused to flow, or may flow intermittently.

The flow rate of the reactant gas differs depending on the type of gas; however, a flow rate within a range of 10–600 cc/min is preferable, and a flow rate within a range of 20–400 cc/min is more preferable.

Figure 2:
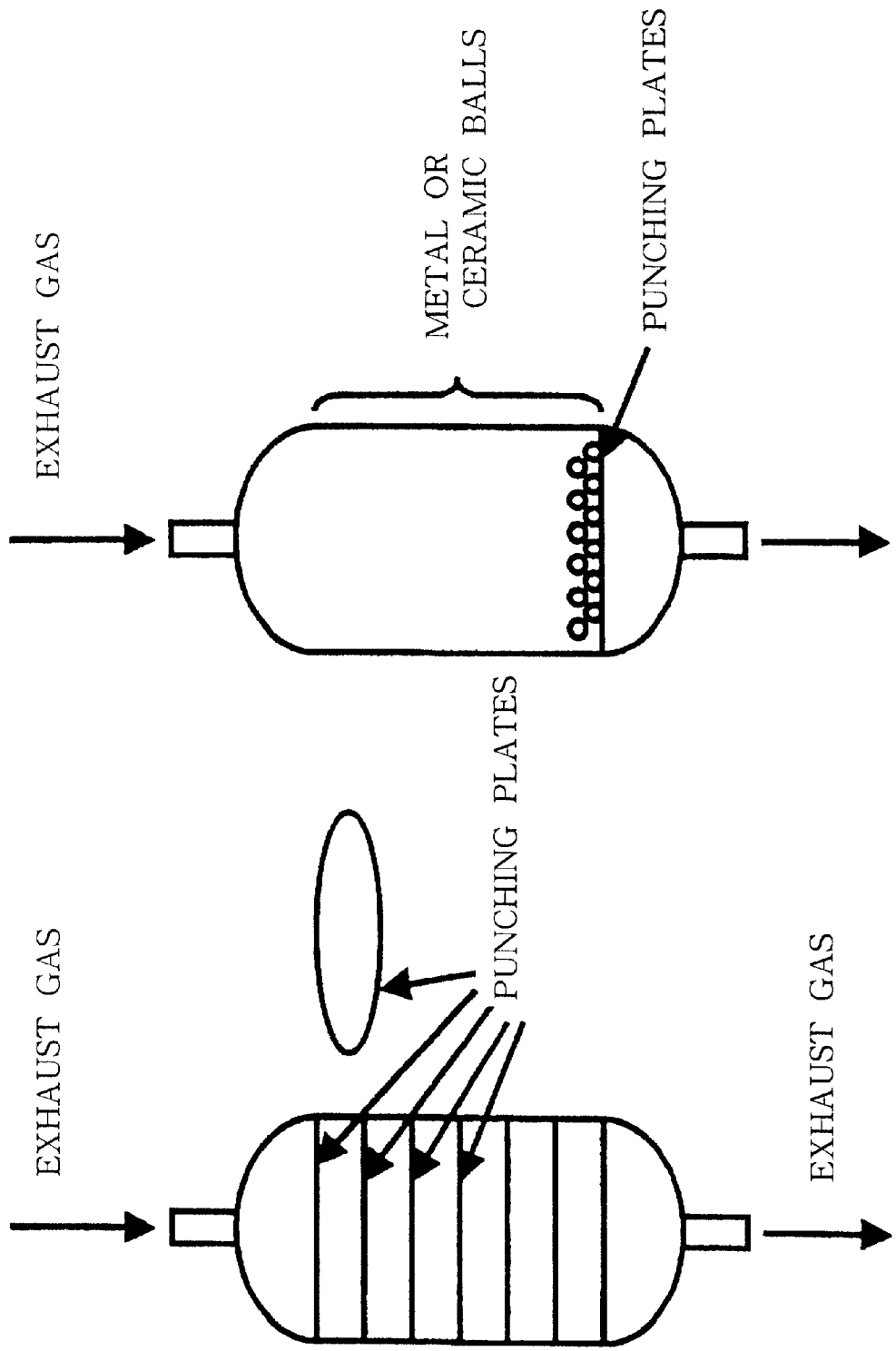
FIG. 2 shows the structure of the adsorption tube and reaction tube of the gas recovering apparatus of the present invention.

The adsorption and reaction tubes are shown in FIG. 2. The structure of the adsorption and reaction tubes are identical; in a pipe shaped object, a number of layers of punching plates are arranged, or metal or ceramic balls are inserted, and this increases the number of impacts between the exhaust gas and the tube and improves heat transfer.

Examples of the reactions in the adsorption tubes and reaction tubes are given below.

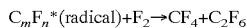
$$C_mF_n*(radical)+F_2 \rightarrow CF_4+C_2F_6$$

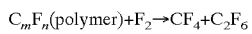
$$C_mF_n(polymer)+F_2 \rightarrow CF_4+C_2F_6$$

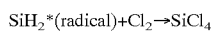
$$SiH_2*(radical)+Cl_2 \rightarrow SiCl_4$$

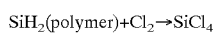
$$SiH_2(polymer)+Cl_2 \rightarrow SiCl_4$$

The gases of the exhaust gas components which have passed through the adsorption tubes and reaction tubes are introduced into a cooling tube to be liquefied and recovered; here, the components are liquefied and cooled to such a temperature that they do not solidify using a heat exchanger, and are recovered. It is possible to use a single stage cooling tube or to use a number of stages. Since the cooling tubes liquefy a plurality of gases, they are set to a plurality of temperature ranges. The temperature ranges may be set to a plurality of ranges within a single stage cooling tube, or alternatively, the temperature may be set to a plurality of temperature ranges in a plurality of stages of cooling tubes.

The setting of the temperature ranges differs based on the processes to which the present invention is applied; however, setting may be carried out as described below.

Etching Process
First stage cooling tube ⁻5° C.–⁻40° C.
Second stage cooling tube ⁻86° C.–⁻90° C.
Third stage cooling tube ⁻128°–⁻184° C.
Epitaxial Process
First stage cooling tube 0° C.–⁻60° C.
Second stage cooling tube ⁻90° C.–⁻100° C.

In the exhaust line from the chamber, by raising the inner surface temperature, which can be accomplished using a heater, of a portion or all of the region between the chamber and the cooling tube to a temperature within a range of 100° C.–200° C., it is possible to prevent the deposition of exhaust gas components on the inner surfaces of the tubing.

Figure 3:
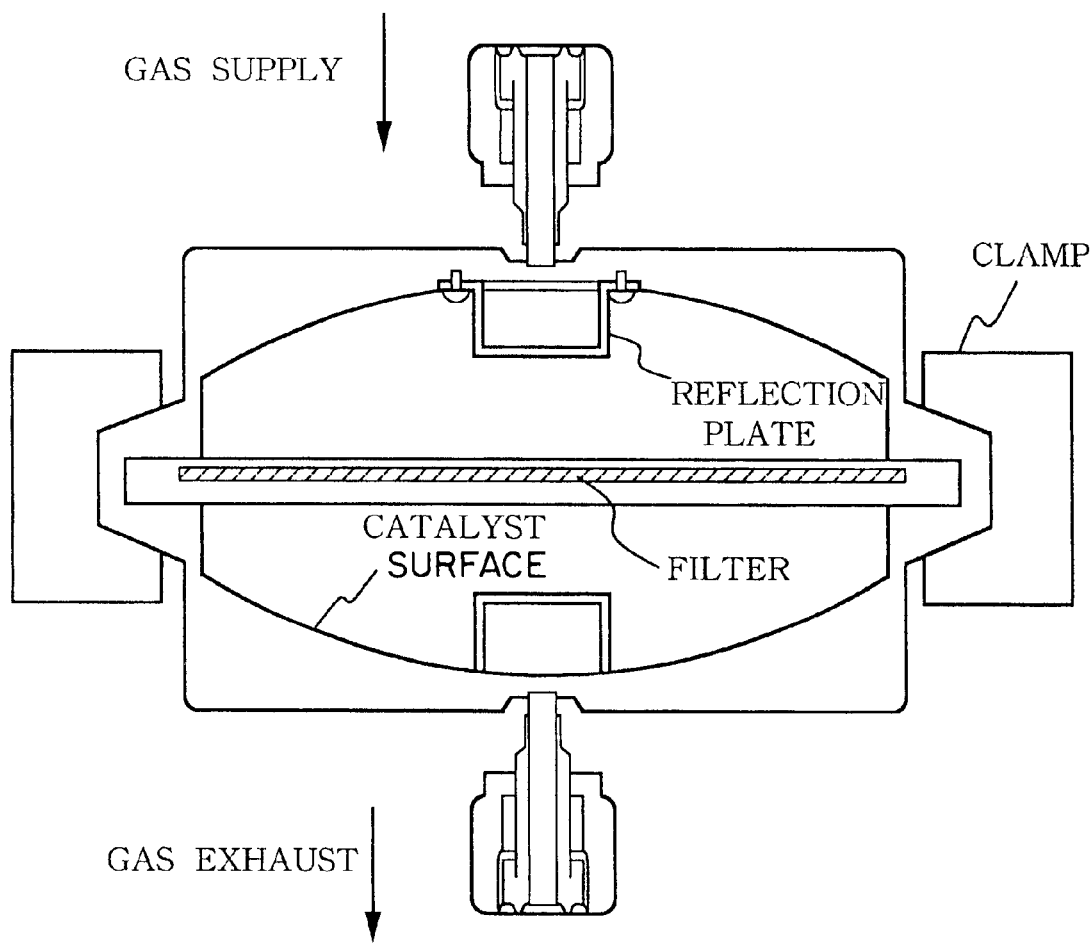
FIG. 3 shows the structure of the reaction tube for carbon monoxide of the present invention.

When reaction tubes are provided in order to remove carbon monoxide within the exhaust gas, these are positioned at the subsequent stage to the cooling tube. The essential parts of the reaction tube are shown in FIG. 3. Within the reaction tube, $O_2$ is added to the carbon monoxide, and by means of catalysis, this is completely oxidized, and becomes carbon dioxide. Examples of the catalyst include copper oxide, iron oxide, nickel oxide, platinum and the like. The reaction of carbon monoxide takes place in the following manner.

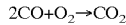
$$2CO+O_2 \rightarrow CO_2$$

An embodiment example of the present invention is given below.

(Embodiment example 1)

FIG. 1 shows an embodiment example of the present invention when exhaust gases from a silicon wafer etching process are to be liquefied and recovered.

In the present embodiment, under a flow of CO, Ar, $O_2$, $C_4F_8$, and in a state in which a constant pressure is maintained by evacuation using a vacuum pump, the gases are excited by a plasma, and the etching of a silicon wafer is conducted.

The excited gases remain in the plasma state, so that they are deposited at spots having low temperatures. For this reason, after the reaction gases are used in a gaseous state, they are liquefied and recovered.

As shown in FIG. 1, the system comprises a vacuum pump, adsorption and decomposition tubes, cooling tubes, and reaction tubes for carbon monoxide.

The conditions of the etching process are as follows: a standard DRAM device is used, and the gas flow rates are CO: 100 cc/min, Ar: 300 cc/min, $O_2$: 50 cc/min, and $C_4F_8$: 150 cc/min, for a total of 600 cc/min.

With respect to the composition of the exhaust gas from the process chamber, this comprises CO:7%, Ar:42%, $O_2$:3.5%, $C_4F_8$:1.4%, $SiF_4$:0.01%, $CF_4$:0.7%, $CO_2$:7%, $C_2F_6$:0.7%, and $C_2F_4$: 38%; the total flow rate was approximately 715 cc/min.

20 cc/min of $F_2$ gas was added to the exhaust gas, the reaction column was heated to 300° C., and the reaction was completed, and a gas was obtained which was subject to liquefaction and recovery. Two systems of adsorption and reaction columns may be provided; of these, one or the other system is alternately connected to the exhaust line and conducts the adsorption of radicals, and when not connected to the exhaust system, $F_2$ gas is introduced therein, the adsorption and reaction columns are heated to 300° C., the radicals are allowed to react completely, and a gas is obtained which is subject to liquefaction and recovery.

At this time, high reactivity was guaranteed by setting the flow rate of the $F_2$ gas to a flow rate which was at least greater than that of the $C_2F_4$ contained in the exhaust gases, and it was thus possible to change the $C_2F_4$, the liquefaction and recovery of which is dangerous, to more stable fluorine compounds. When gases other than $C_2F_4$ which react with $F_2$ are present in the exhaust gases, the flow rate of the $F_2$ gas may be increased by the amount of gas consumed by these other gases.

After the adsorption and reaction columns, 3 cooling tubes are disposed in a connected manner, and these cool the components to, respectively, −20° C., −88° C., and −150° C.

The volumetric ratio in the first stage cooling tube, which was set to −20° C., when the fluid supplied was made into a gas was $C_4F_8$:100% at a boiling point of −5.8° C.

The volumetric ratio in the second stage cooling tube, which was set to −88° C., when the liquid supplied was made into a gas was $SiF_4$:0.07% with a boiling point of −86° C., $CO_2$:27% at a boiling point of −78.5° C., $C_2F_4$:71% at a boiling point of −76.3° C., and $C_2F_6$:1.6% at a boiling point of −78.15° C.

The volumetric ratio in the third stage cooling tube, which was set to −150° C., when the fluid supplied was changed into a gas was $C_2F_4$:95.2%, $CF_4$:3.4% at a boiling point of −127.9° C., and $C_2F_6$:1.4%.

The composition of the gas released from the cooling tubes was Ar:80%, CO:13.3%, $O_2$:6.7%, and $CF_4$:0.13%.

The capture efficiency with respect to fluorocarbons was 98.3%, so that the gases were liquefied and recovered with extremely high efficiency.

Furthermore, conventionally, when the vacuum pump/exhaust system piping were set to room temperature, the deposition of unreacted gas components on the inner walls occurred, and the piping became blocked, so that pump maintenance was required at intervals of two weeks; however, in this case, the inner surfaces of the vacuum pump/exhaust system piping are all maintained at a temperature of 150° C., and thereby, recovery can be conducted at high efficiency without pump trouble for a period of one year.

The reaction column employing a platinum catalyst which served to oxide the carbon monoxide was provided at a subsequent stage to the cooling tubes, and $O_2$ was added thereto at a rate of 50 cc/min, and this was heated to 300° C. to conduct the reaction. The composition of the resulting exhaust gases was Ar:74.9%, $O_2$:12.5%, $CF_4$:0.12%, and $CO_2$:12.5%, so that the organic materials present in the exhaust gases were liquefied and recovered, or were rendered harmless by complete oxidation.

(Embodiment example 2)

Figure 4:
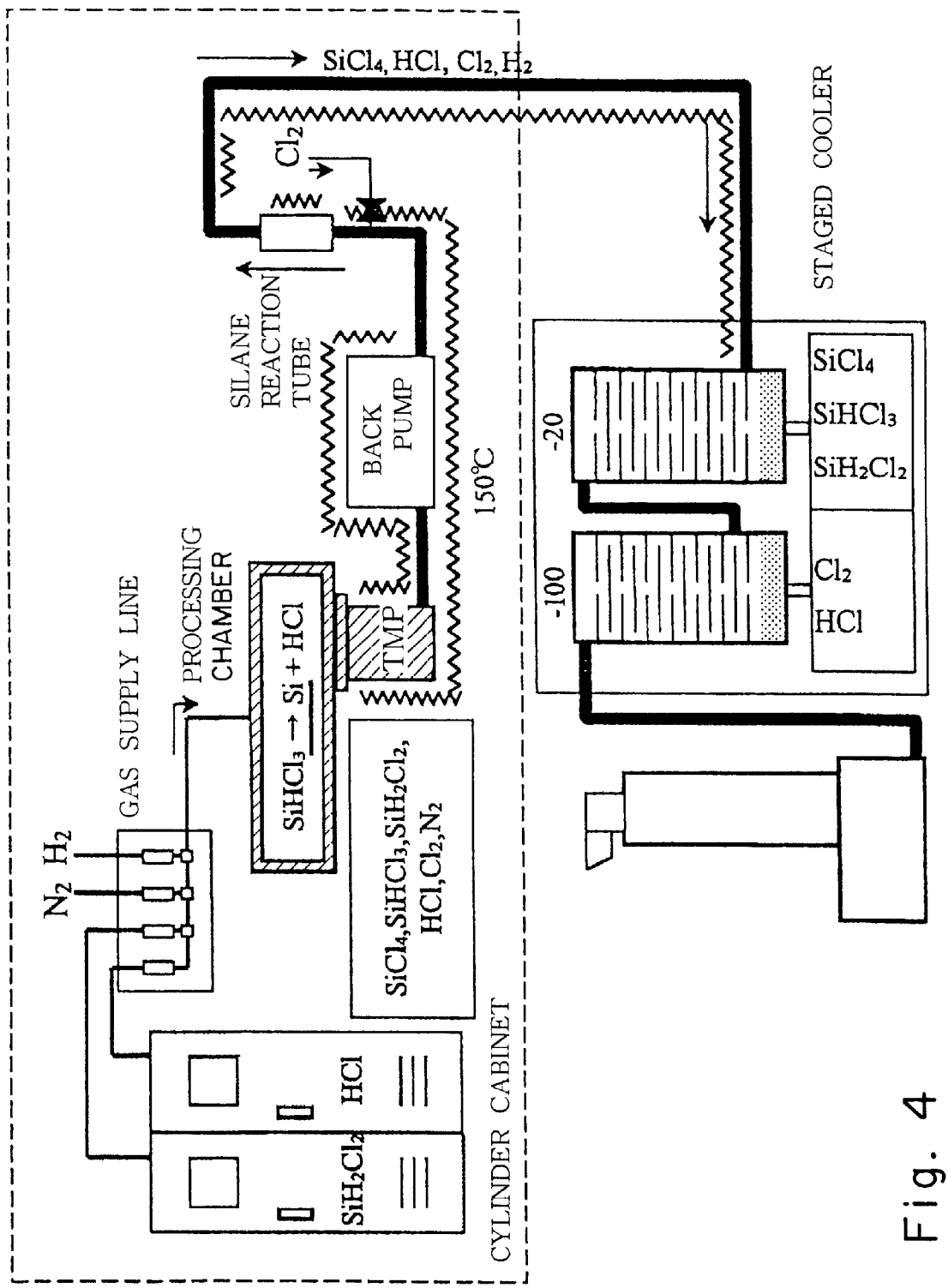
FIG. 4 shows an example of a system having the gas recovering apparatus of the present invention.

In FIG. 4, an embodiment example of the present invention is shown in which exhaust gases from an Si—Epi (epitaxial) growth process are liquefied and recovered.

The present process is conducted using $SiHCl_3$ and $H_2$. In the present process, plasma is not employed, and the reaction is conducted by heating to a high temperature, so that the reaction is not complete, and unreacted components are deposited on the interior of the reaction vessel and on the exhaust system. For this reason, after the reaction gas is reacted as a gas, liquefaction and recovery are conducted.

As shown in FIG. 2, the system comprises a vacuum pump, adsorption and reaction tubes, cooling tubes, and a combustion type removal apparatus.

The process comprises $H_2$ annealing and film formation; cleaning is conducted using HCl between processes.

In actual film formation processes, $H_2$ is used as a carrier gas and is caused to flow at a rate of 10 L/min, and $SiHCl_3$ is supplied at a rate of 5 g/min (860 cc/min). In a component ratio, this results in 7.9% thereof.

Immediately prior to the reaction tubes, $Cl_2$ gas is supplied at a rate of 400 cc/min, and unreacted or incompletely reacted components are thus completely reacted, and only $SiCl_4$ and HCl result. The cooling tubes are arranged in two stages in series, and these conduct cooling to, respectively, $-20°$ C. and $-100°$ C.

In the first stage cooling tube which is set to $-20°$ C., $SiCl_4$ is obtained at a boiling point of 57.6° C., and the gas composition of the recovery liquid is 99% $SiCl_4$.

In the second stage cooling tube which was set to $-100°$ C., HCl is obtained at a boiling point of –85.3° C.

The gas composition of the recovered liquid was 97% HCl.

The composition of the gas flowing through the liquefying and recovering apparatus was $H_2$:100%, and this was combusted in the combustion type removal apparatus.

During HCl cleaning, HCl gas was caused to flow at a rate of 5 L/min, while $H_2$ was caused to flow at a rate of 10 L/min.

The composition of the exhaust gas was 68.5% $H_2$, 30.8% HCl, and 0.7% $SiCl_4$.

In the first stage cooling tube, $SiCl_4$ was liquefied and recovered, and the gas composition of the recovered liquid was 99% $SiCl_4$.

In the second stage cooling tube, HCl was liquefied and recovered, and the gas composition of the recovered liquid was 100% HCl.

The composition of the gas passing through the liquefying and recovering apparatus was 100% $H_2$, and this was combusted in the combustion type removal apparatus.

With respect to the exhaust gases of beth the film formation process and the cleaning process, recovery was possible without the escape of gases other than $H_2$.

[Vacuum Exhausting Method and Apparatus]

Next, a vacuum exhausting method and apparatus for suppressing the reverse dispersion of the exhaust gas components within the pump will be described.

Figure 5:
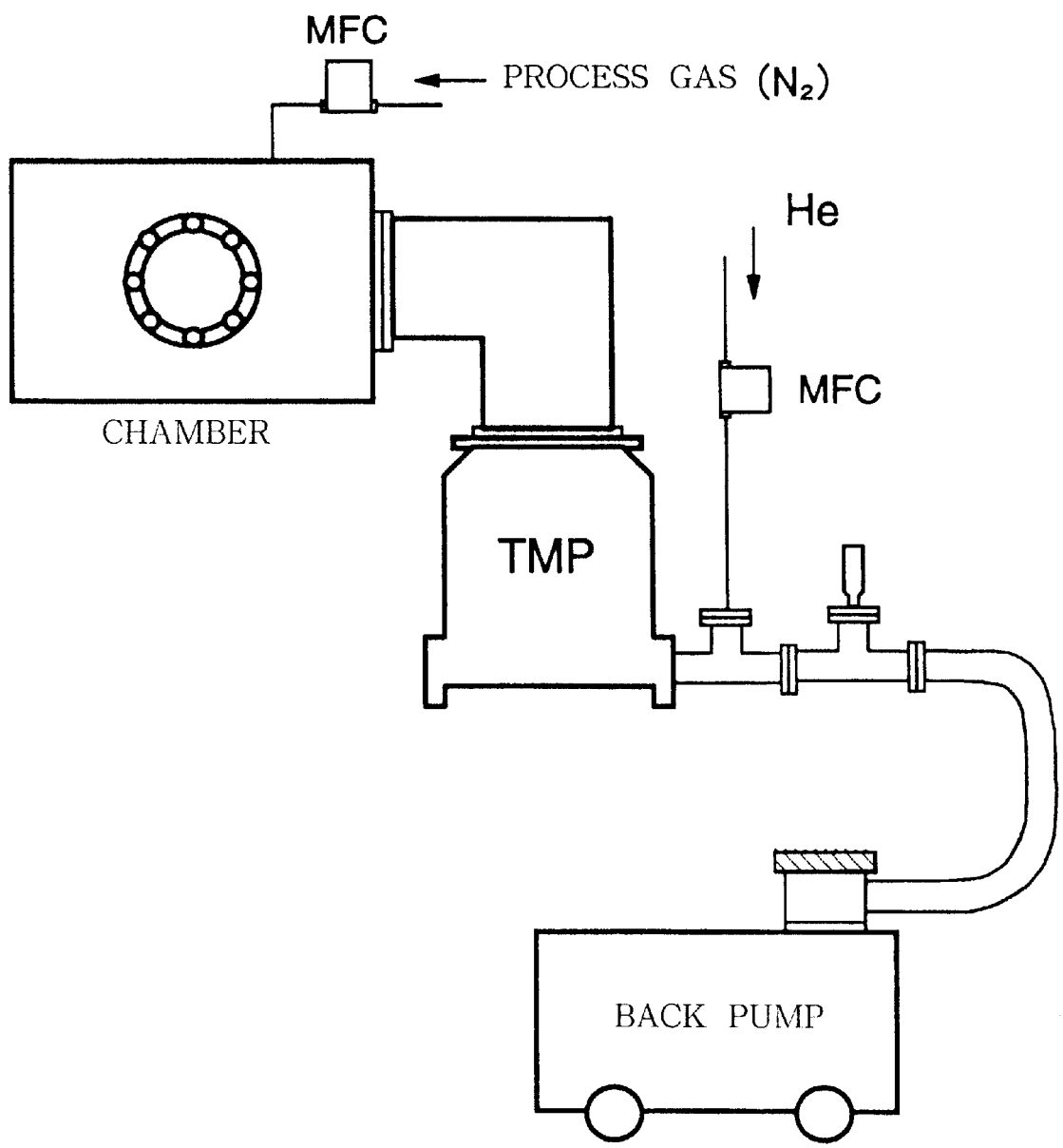
FIG. 5 is an example of a vacuum exhausting apparatus of the present invention.
Figure 6:
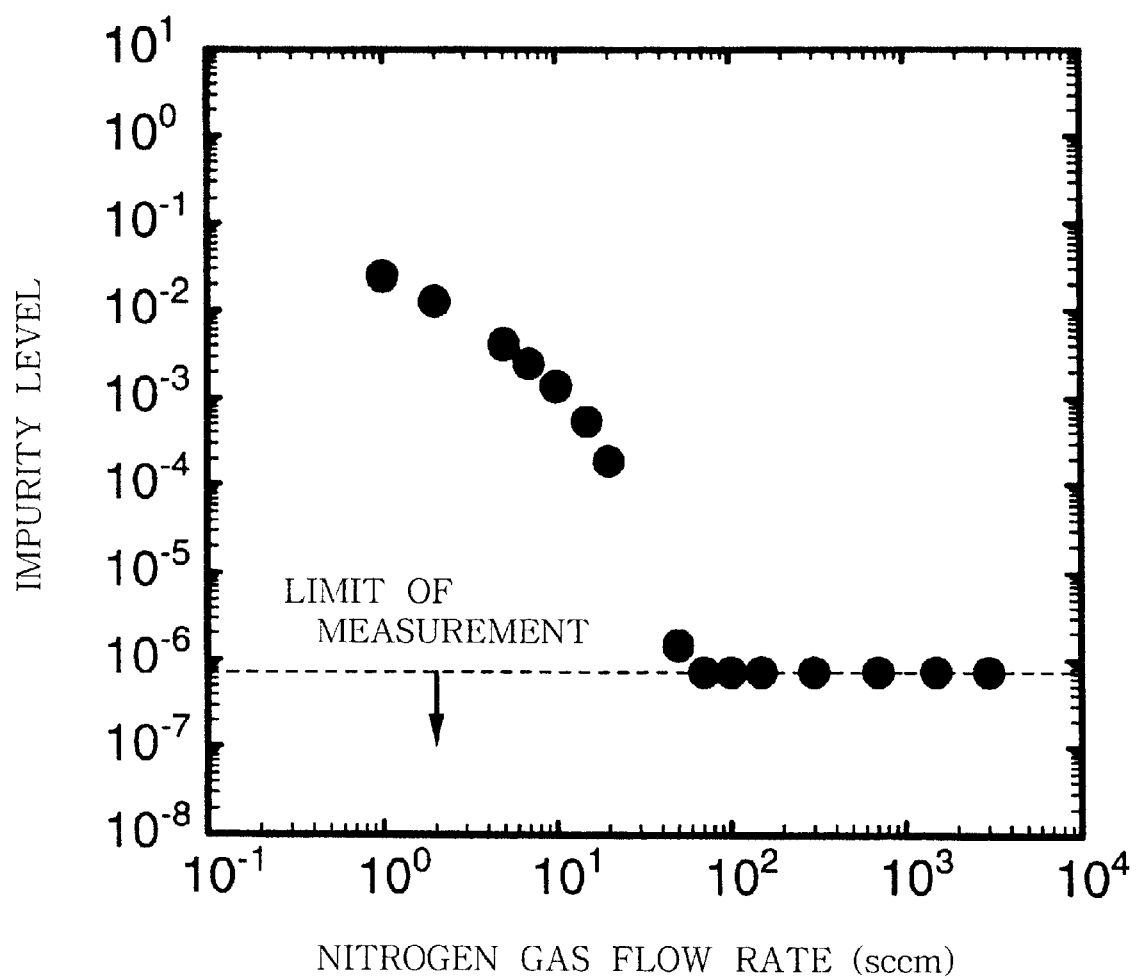
FIG. 6 shows the relationship between the impurity level within the chamber and the nitrogen gas flow rate from upstream of the pump.
Figure 7:
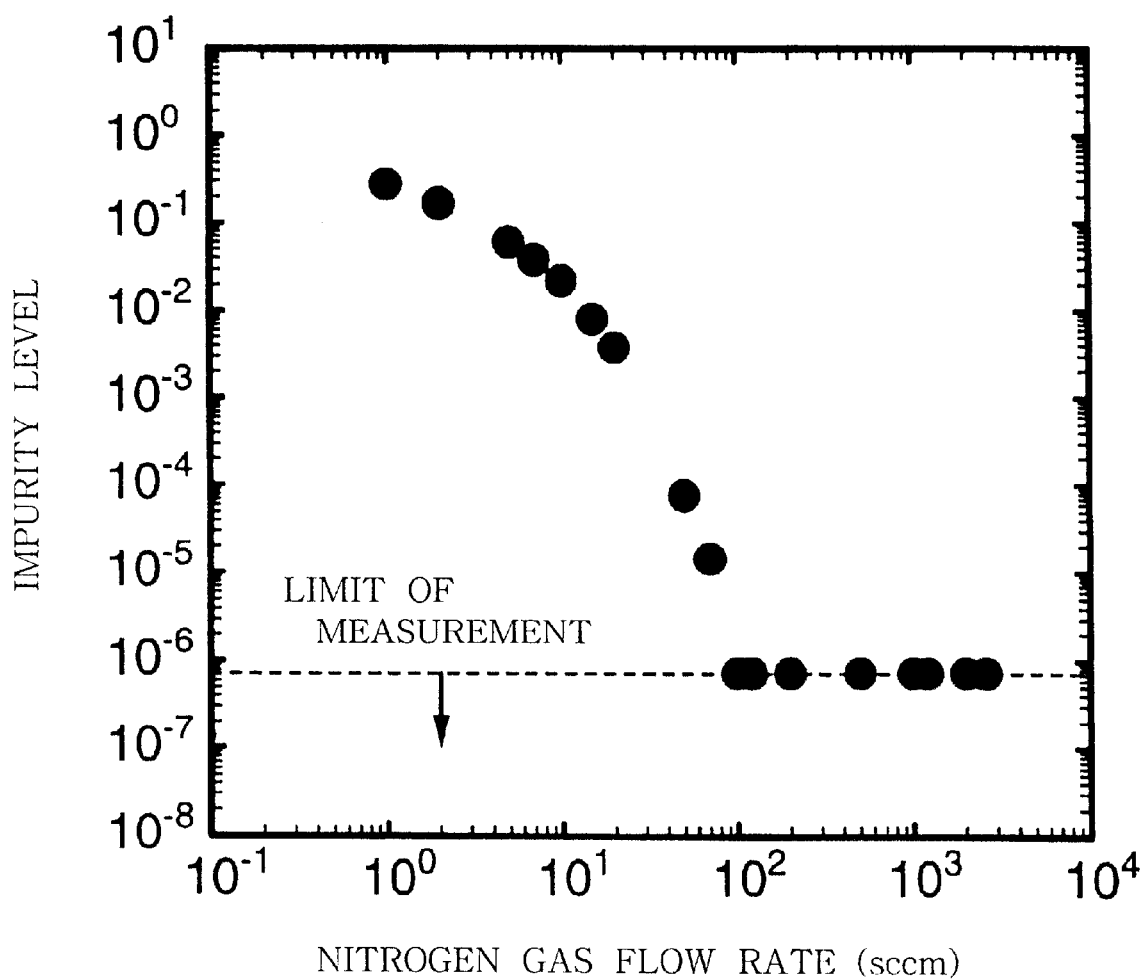
FIG. 7 shows the relationship between the impurity level within the chamber and the flow rate of the nitrogen gas flowing from upstream of the pump.

The relationship between the impurity level within the chamber and the nitrogen gas flow rate flowing from upstream of the pump, when, for example, He is introduced into the exhaust side of a turbomolecular pump in the gas exhaust system shown in FIG. 5, is shown in FIG. 6. What is meant by the impurity level is the proportion of impurities in all gas components within the chamber. Here, the He gas flow rate was 400 sccm. As shown in FIG. 4, by flowing gas from upstream of the pump, it was possible to dramatically increase the degree of cleanliness within the chamber. Here, the gas which was caused to flow from upstream of the pump was nitrogen; however, the same effects will be obtained even if a gas such as, for example, Ar, $H_2$, $O_2$, $O_2$, or the like, is caused to flow in place of nitrogen.

Gas continually flows within the chamber at all times, that is to say, not merely during processing, but also during transfer of the substrate, and the like, so that it is possible to increase the degree of cleanliness within the chamber in a step-wise manner. By employing the case in which nitrogen gas was caused to flow at rate of 20 sccm, and the case in which no nitrogen gas flowed, when processing was not being conducted, a Al film was formed on a high concentration silicon substrate, and the contact resistance thereof was measured. The contact resistance when nitrogen gas was continuously caused to flow was extremely low, at $1 \times 10^{-9}$ $\Omega cm^2$, while when nitrogen gas was not caused to flow, this increased by two orders of magnitude, at $3 \times 10^{-7}$ $\Omega cm^2$. The reason for this is that, as a result of the reverse dispersion of the impurities via the pump, impurities were deposited at the interface between the Al and the silicon.

This type of effect is not specific to turbomolecular pumps; it also occurs in back pumps.

The case in which a screw pump is employed is shown in FIG. 5. The reverse flow from a back pump has particularly adverse effects on the process. Accordingly, by means of the constant flow of some type of gas from upstream of the back pump, it is possible to greatly improve the manufacturing processes, such as the formation of high quality films and the like. Furthermore, when the chamber is to be placed in a vacuum state, some type of gas can be caused to flow between the turbomolecular pump (TMP) and the back pump, and thereby, it is possible to realize an ultraclean processing space.

What is claimed is:

1. A gas recovering apparatus comprising:

a processing chamber with a downstream exhaust line;

at least one of adsorption columns disposed in said exhaust line, said columns for adsorbing one or more production exhaust gas components within an exhaust gas from said chamber, and reaction tubes for directly degrading said one or more production exhaust gas components;

a means for introducing at least one of $F_2$ and $Cl_2$ gas which is able to react to said one or more production exhaust gas components downstream from said chamber and upstream from at least one of said adsorption columns and said reaction tubes; and cooling tubes for liquefying and recovering production exhaust gases from said at least one of adsorption columns and said reaction tubes.

2. A gas recovering apparatus in accordance with claim 1, said cooling tubes having a plurality of zones, said plurality of zones are at different temperatures.

3. A gas recovering apparatus in accordance with claim 1, wherein said cooling tubes for cooling and liquefying gases are provided each maintained at cascading lower temperatures in the downstream direction.

4. A gas recovering apparatus in accordance with claim 1, wherein said reaction tubes are provided for completely oxidizing carbon monoxide within said exhaust gases.

5. A gas recovering apparatus in accordance with claim 1, wherein a removal means is provided for completely oxidizing carbon monoxide present in the production exhaust gases using a catalyst from the group of copper oxide, iron oxide, nickel oxide, or platinum, and exhausting carbon dioxide.

6. A gas recovering apparatus in accordance with claim 1, wherein said at least one adsorbing column having a reaction tube, said reaction tube used for directly reacting unreacted or partially reacted production exhaust gas components and making these components into gases.

7. A gas recovering apparatus in accordance with claim 1, including a heater so a portion or all of the inner surfaces between the chamber and the cooling tubes are set to a temperature within a range of 100–200° C.

* * * * *